(12) United States Patent
Inoue et al.

(10) Patent No.: US 7,937,720 B2
(45) Date of Patent: May 3, 2011

(54) DISK CARRYING DEVICE AND OPTICAL DISK RECORDING/REPRODUCING DEVICE

(75) Inventors: Takashi Inoue, Kanagawa-ken (JP); Yutaka Hino, Kanagawa-ken (JP); Junya Takahashi, Kanagawa-ken (JP); Hiroki Kobayashi, Kanagawa-ken (JP); Tatuo Ito, Tokyo (JP)

(73) Assignee: Panasonic Corporation, Osaka (JP)

( * ) Notice: Subject to any disclaimer, the term of this patent is extended or adjusted under 35 U.S.C. 154(b) by 1200 days.

(21) Appl. No.: 11/569,309

(22) PCT Filed: May 13, 2005

(86) PCT No.: PCT/JP2005/008744
§ 371 (c)(1),
(2), (4) Date: Nov. 17, 2006

(87) PCT Pub. No.: WO2005/112026
PCT Pub. Date: Nov. 24, 2005

(65) Prior Publication Data
US 2010/0218205 A1    Aug. 26, 2010

(30) Foreign Application Priority Data
May 19, 2004   (JP) ................ 2004-148932

(51) Int. Cl.
*G11B 17/04*    (2006.01)
*G11B 17/043*   (2006.01)
(52) U.S. Cl. ........................................ 720/624
(58) Field of Classification Search ............... 720/624, 720/625
See application file for complete search history.

(56) References Cited

U.S. PATENT DOCUMENTS

| 6,735,161 | B1 * | 5/2004 | Sato et al. ............... 720/621 |
| 6,952,832 | B2 * | 10/2005 | Lee et al. ............... 720/624 |
| 7,308,692 | B2 * | 12/2007 | Kasama et al. ............ 720/625 |
| 2002/0018427 | A1 | 2/2002 | Hino et al. | |

FOREIGN PATENT DOCUMENTS

| EP | 1 396 861 A | | 3/2004 |
| JP | 2-239461 A | | 9/1990 |
| JP | 08111054 A | * | 4/1996 |
| JP | 11195262 A | * | 7/1999 |

(Continued)

OTHER PUBLICATIONS

International Search Report for PCT/JP2005/008744, dated Jun. 14, 2005.

(Continued)

*Primary Examiner* — William J Klimowicz
(74) *Attorney, Agent, or Firm* — RatnerPrestia

(57) ABSTRACT

In a disk carrying device including a first idle gear rotatably supported by a lower chassis and a second idle gear for contacting and separating from the first idle gear to perform a rotation operation, the second idle gear and a roller gear meshing therewith are rotatably supported by a feed plate to cause the second idle gear to contact and separate, from below, from the first idle gear rotatably supported by the lower chassis. Because of this configuration, in disk insertion, a downward force F1 acts on the second idle gear and a pushing pressure of the feed roller to a disk D decreases. In disk ejection, an upward force F2 acts on the second idle gear and the pushing pressure of the feed roller to the disk D increases.

4 Claims, 4 Drawing Sheets

FOREIGN PATENT DOCUMENTS

| | | | |
|---|---|---|---|
| JP | 2000-123453 A | | 4/2000 |
| JP | 2001-344861 A | | 12/2001 |
| JP | 2002-288911 A | | 10/2002 |
| JP | 2002-334500 A | | 11/2002 |
| JP | 2002329358 A | * | 11/2002 |
| JP | 2003-77199 A | | 3/2003 |
| JP | 2003-123358 A | | 4/2003 |
| JP | 2003162871 A | * | 6/2003 |

OTHER PUBLICATIONS

European Search Report EP 05 73 9285, dated Nov. Feb. 5, 2008.

* cited by examiner

INSERTION

EJECTION

DISK CARRYING DEVICE AND OPTICAL DISK RECORDING/REPRODUCING DEVICE

BACKGROUND OF THE INVENTION

1. Technical Field of the Invention

The present invention relates to a disk carrying device for carrying a disk by a rotatable feed roller and to an optical disk recording/reproducing device having the disk carrying device.

2. Description of the Related Art

In the field of optical disk recording/reproducing device, particularly optical disk recording/reproducing device for automobile use, there has been a strong demand from the market for the size and thickness reduction, and technology for realizing this is being actively developed. In order to achieve the size and thickness reduction of the optical recording/reproducing device, there is adopted a method of carrying an optical disk directly held by a feed roller and a disk guide therebetween when the optical disk is inserted into and ejected from a device, rather than a method of placing the optical disk on a tray (see, for example, Patent Document 1).

FIG. 1A is a schematic top view of a lower chassis in an optical disk recording/reproducing device for automobile use 100 of this kind, where components are illustrated on the same plane for operational description. FIG. 1B is a schematic side view of the same. In FIGS. 1A and 1B, the front of the device is shown in the right side of the figures, and a disk carrying device 11 is provided in one of side portions of a lower chassis 10 which is a main chassis of the device. The disk carrying device 11 includes a metal feed plate 12 extending in a width direction in a front portion of the lower chassis 10, where a rotary shaft 13 is provided protruding from the center of both side portions of the feed plate 12 and is rotatably supported by the lower chassis 10. A rubber feed roller 14 expanding from a central portion toward both end portions thereof in tapered fashion, is rotatably attached to rear end portions of the feed plate 12. The feed roller 14 is inserted into a roller shaft 15 by a loose fit so as to slip relative to the roller shaft 15. Incidentally, as the roller shaft 15 is thin and long, a sleeve 16 is press-fitted into a central portion thereof for the purpose of reinforcement. The sleeve 16 is configured to be supported in the central portion of the feed plate 12. The feed plate 12 is urged to rotate so that the side of the feed roller 14 is oriented upward, by extension springs 17, 18 provided respectively between the both side portions thereof and the lower chassis 10. Because of this configuration, a disk inserted in A direction from the front is held by between the feed roller 14 and a disk guide provided in an upper chassis. In this way the disk can be carried by the rotation of the feed roller 14. The disk guide is integrated into the upper chassis or provided separately.

In the disk carrying device 11, a disk carrying motor 21 is provided in one of front end portions of the lower chassis 10. A worm 23 is fixed to a motor shaft 22 of the disk carrying motor 21, where a toothed wheel 24a in the first stage of a worm wheel 24 meshes with the worm 23, a first idle gear 25 meshes with a toothed wheel 24b in the second stage of the worm wheel 24, a second idle gear 26 meshes with the first idle gear 25, and a roller gear 27 meshes with the second idle gear 26. The worm wheel 24, the first idle gear 25 and the second idle gear 26 are rotatably supported by the lower chassis 10, respectively. The roller gear 27 fixed to a roller shaft 15 of the feed roller 14 engages with and disengages from the second idle gear 26 along with the swinging of the feed plate 12. On the other hand, a gear array of another system is configured from the second idle gear 26 via other idle gears 28, 29 and 30. The last idle gear 30 is configured to be detachably engaged with a rack 31. The rack 31 in the normal state is pulled by a spring, not shown, backward the device, and does not mesh with the idle gear 30.

The operation of the disk carrying device 11 configured as described above will be described. In FIGS. 1A and 1B, when the disk is inserted in A direction from the front, the disk carrying motor 21 rotates in response to a signal from a photo sensor that detected the insertion. This causes the feed roller 14 to rotate via the worm 23, worm wheel 24, first idle gear 25, second idle gear 26, and the roller gear 27. The inserted disk is held between the feed roller 14 and a guide plate provided in the upper chassis and the disk is carried to a depth side of the device. When the inserted disk has been carried to the depth side of the device, the movement of the disk is stopped by a stopper not shown. A switch lever 33 is pushed by an outer periphery of the disk and rotates to allow a pushing tab 34 to push a cam plate 32 in a forward direction. Thus, the rack 31 integrally formed with the cam plate 32 moves forward and meshes with the rotating idle gear 30. The cam plate 32 moves forward to push down the roller shaft 15 of the feed roller 14 by a front portion 32a of the cam plate 32. Then the feed roller 14 separates from the disk, while a disk clamper 35 pushes an insertion hole of the disk against a turntable 36 to fix the disk on the turntable 36. Subsequently, a spindle motor 37 rotates, an optical pickup operates, and thus a recording/reproduction operation is performed to the disk.

Patent Document 1: Japanese Patent Publication Laid-Open No. HEI 8(1996)-138298

SUMMARY OF THE INVENTION

However, in the above described conventional disk carrying device, there has been a problem that the motor load relatively increases as a disk carrying force by the feed roller 14 is strong in insertion, and that the disk is not smoothly carried as the disk carrying force is weak in ejection. This problem will be described with reference to FIGS. 2A and 2B. As shown in FIGS. 2A, 2B, the second idle gear 26 is provided below the first idle gear 25 and the roller gear 27. In the disk insertion shown in FIG. 2A, from the worm 23 fixed to the motor shaft 22 of the disk carrying motor 21 via the worm wheel 24, the first idle gear 25 rotates counterclockwise, the second idle gear 26 rotates clockwise, and the roller gear 27 rotates counterclockwise. The feed roller 14 pushes the disk thereon against the disk guide, and carries the disk to the depth side of the device. At this time, the second idle gear 26 rotates clockwise to push the roller gear 27 upward, so that the pushing pressure to the disk is secured and the disk is smoothly carried. However, when the disk has been completely carried to the depth side of the device, as the movement of the disk is stopped by the stopper but the disk carrying motor 21 is still rotating, the feed roller 14 slips while pushing the disk during the slip motion. Thus a heavy load is on the disk carrying motor 21, causing a decrease of the operating margin relative to the idle gear 28 and subsequent gears of another system. On the other hand, in the disk ejection shown in FIG. 2B, from the worm 23 of the disk carrying motor 21 via the worm wheel 24, the first idle gear 25 rotates clockwise, the second idle gear 26 rotates counterclockwise, and the roller gear 27 rotates clockwise. The feed roller 14 pushes the disk thereon against the disk guide and carries the disk to the front side of the device. At this time, the second idle gear 26 rotates counterclockwise to push the roller gear 27 downward, so that a downward force acts on the feed roller 14 and the pushing pressure to the disk decreases. Thus, there may be a case where the disk is not smoothly carried as the feed roller 14 slips relative to the roller shaft 15 depending on the warping of the disk, the friction coefficient of the disk surface and the like.

The present invention is to solve the conventional problem as described above and its object is to provide a disk carrying device capable of reducing the load on a motor to smoothly carry a disk, and to provide an optical disk recording/reproducing device having the same.

In order to achieve the above object, a disk carrying device according to the invention includes: a feed plate that rotatably supports a feed roller; a lower chassis that rotatably supports the feed plate; a disk carrying motor fixed to the lower chassis to rotate the feed roller via a gear array; a disk guide provided in an upper chassis to hold a disk between it and the feed roller; and springs that urges the feed roller to rotate so that the feed roller abuts the disk guide, wherein the gear array includes: a worm gear that transmits a torque of the disk carrying motor; a first idle gear rotatably supported by the lower chassis to transmit the torque from the worm gear; a second idle gear rotatably supported by the feed plate and being detachably engaged with the first idle; and a roller gear fixed to a roller shaft of the feed roller to mesh with the second idle gear.

Because of this configuration, the second idle gear, which is supported together with the roller gear by the feed plate, contacts and separates from the first idle gear along with the swinging of the feed plate. Thus, in the disk insertion, when the drive force from the disk carrying motor is transmitted from the worm gear to the first idle gear and is transmitted from the first idle gear to the second idle gear, the downward force is applied to the second idle gear by the first idle gear and the downward force acts on the feed roller via the roller gear. When the disk has been completely carried to the depth side of the device and when the feed roller slips, the pushing pressure of the feed roller to the disk decreases and the load on the disk carrying motor is reduced. Thus a low output motor can be adopted. In this way, the power consumption decreases and the heat from the motor is suppressed, so that the gears can be made of a relatively soft resin material as the temperature-resistance characteristic is improved and the forces on the gears decrease. Consequently it is possible to reduce gear noise from gear meshing sound. Further, in the disk ejection, the upward force is applied to the second idle gear from the first idle gear and the upward force acts on the feed roller via the roller gear, so that the pushing pressure of the feed roller to the disk increases. Thus the disk ejecting force can be increased. In this way, it is possible to smoothly carry the disk, regardless of the warping of the disk and the friction coefficient of the disk surface.

The present invention is to provide a disk carrying device where a gear array for transmitting a drive force of a disk carrying motor to a feed roller, includes: a worm gear for transmitting a torque of the disk carrying motor; a first idle gear rotatably supported by a lower chassis to transmit the torque from the worm gear; a second idle gear rotatably supported by a feed plate and being detachably engaged with the first idle gear; and a roller gear fixed to a roller shaft of the feed roller to mesh with the second idle gear. Because of this configuration, in the disk insertion, a downward force from the first idle gear is applied to the second idle gear and the downward force acts on the feed roller via the roller gear, so that a pushing pressure of the feed roller to the disk decreases and a load on the disk carrying motor is reduced. Thus a low output motor can be adopted. In addition, there is an advantage that in the disk ejection, an upward force from the first idle gear is applied to the second idle gear and the upward force acts on the feed roller via the roller gear, so that the pushing pressure of the feed roller to the disk increases, and thus the disk ejecting force can be increased.

The above object and advantages of the present invention will become more apparent by the following descriptions of the preferred embodiment thereof with reference to the accompanying drawings.

DETAILED DESCRIPTION OF THE PREFERRED EMBODIMENT

Figure 1A:
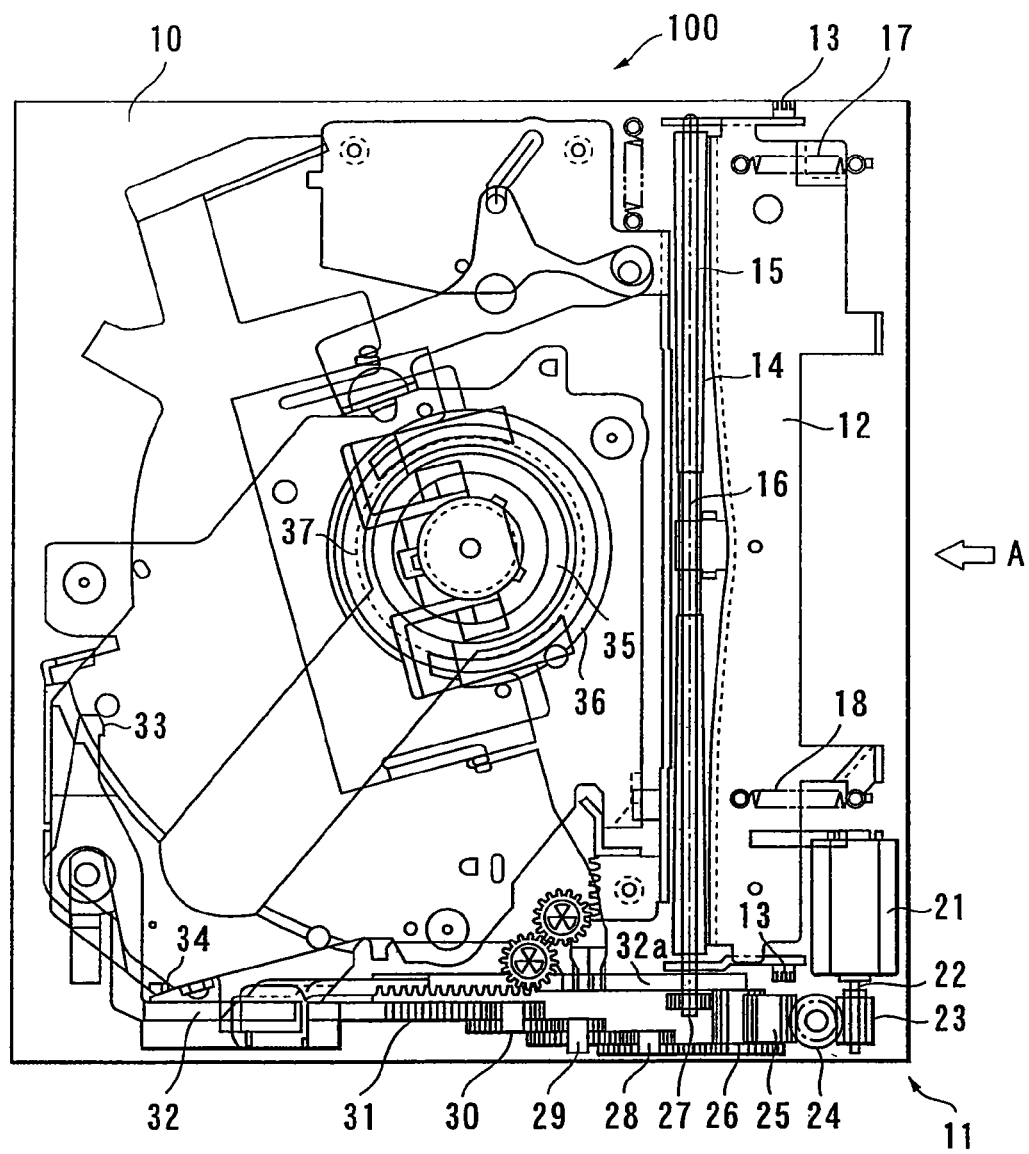
FIG. 1A is a schematic top view of a disk carrying device in a conventional example.
Figure 1B:
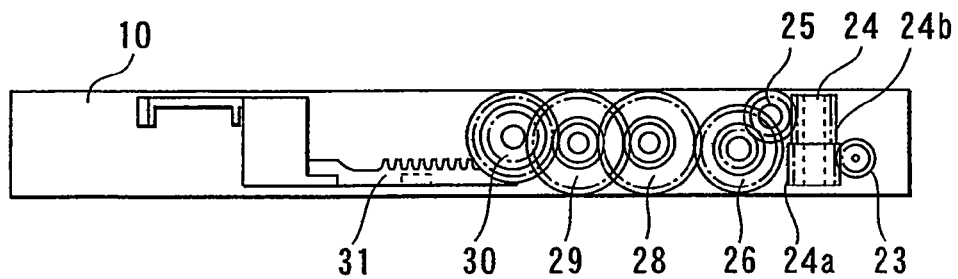
FIG. 1B is a schematic side view of the disk carrying device.
Figure 2A:
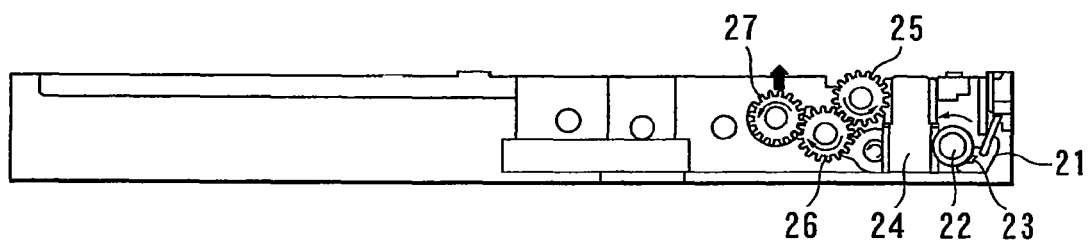
FIG. 2A is a schematic side view of when a disk is inserted in the conventional example.
Figure 2B:
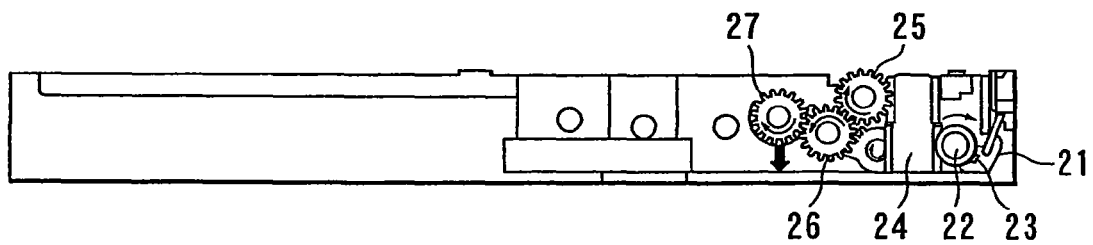
FIG. 2B is a schematic side view of when the disk is ejected in the conventional example.
Figure 3:
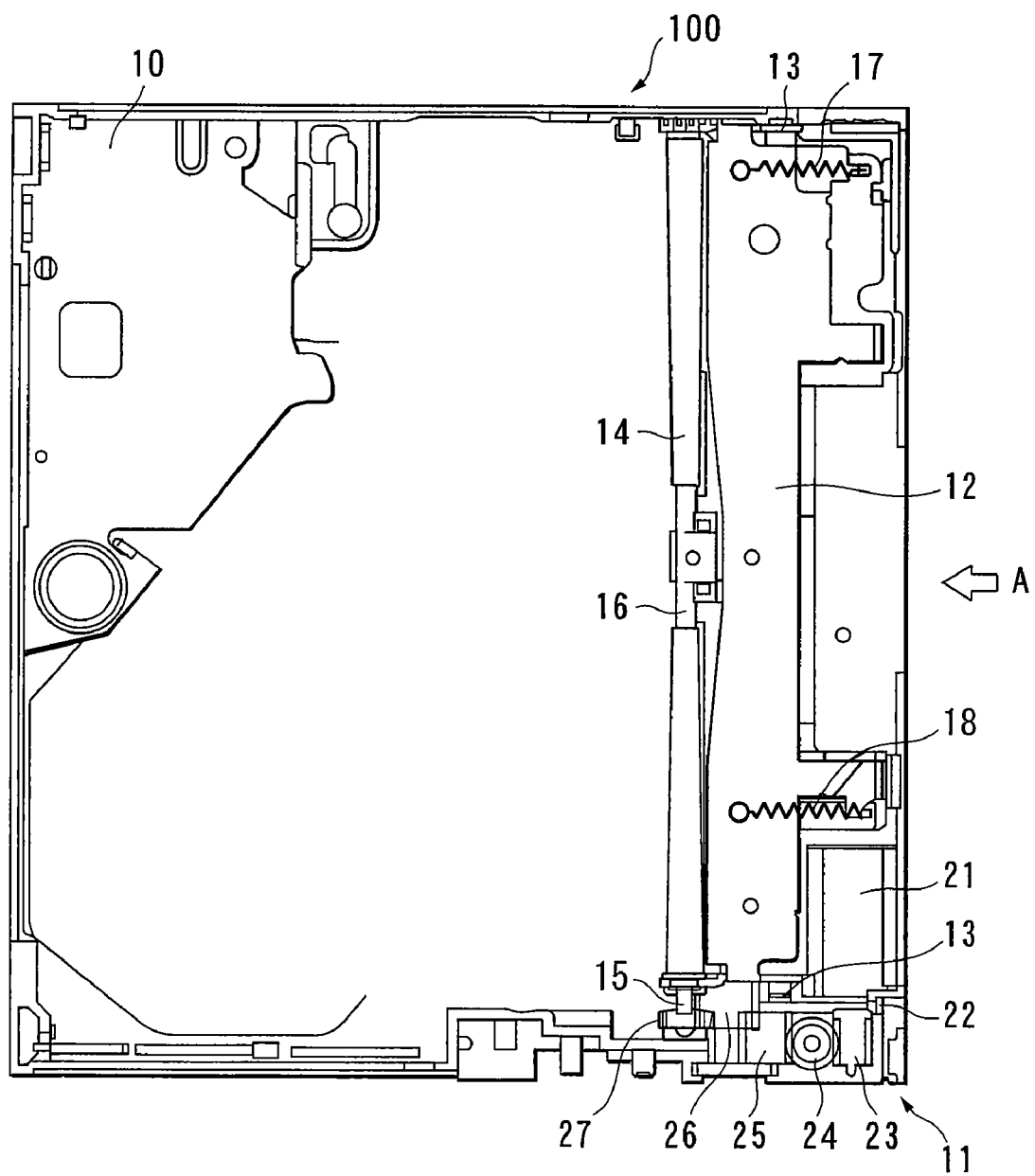
FIG. 3 is a schematic top view of a lower chassis of an optical disk recording/reproducing device for automobile use having a disk carrying device according to an embodiment of the present invention.
Figure 4A:
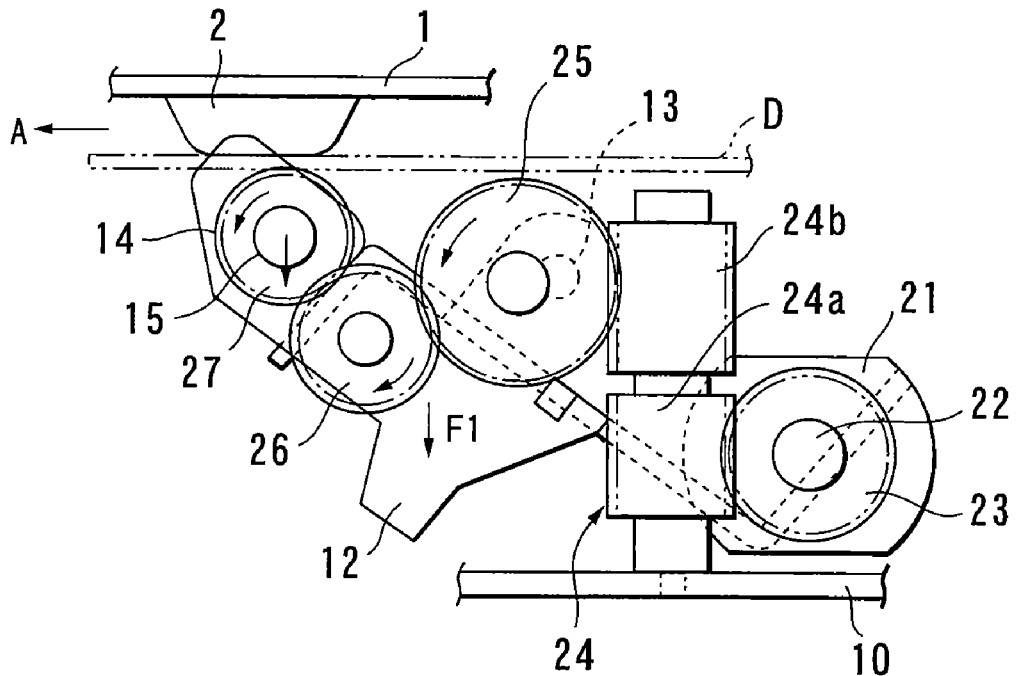
FIG. 4A is a schematic side view of when a disk is inserted into the disk carrying device according to the embodiment.
Figure 4B:
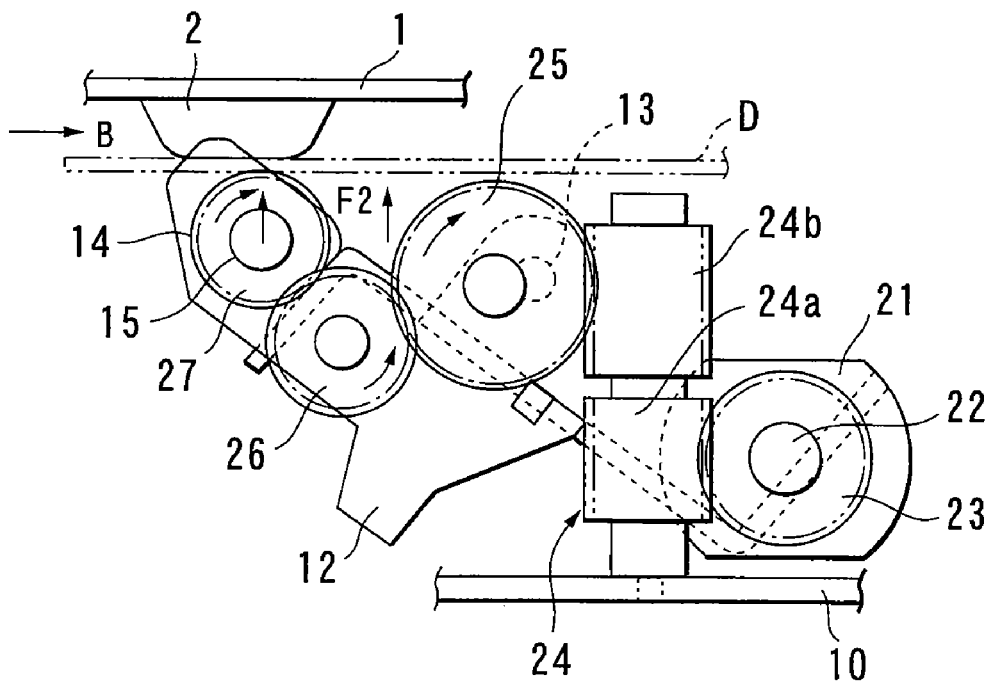
FIG. 4B is a schematic side view of when the disk is ejected from the disk carrying device according to the embodiment.

Hereinafter, a preferred embodiment of the present invention will be described with reference to accompanying drawings. FIG. 3 is a schematic top view of a lower chassis of an optical disk recording/reproducing device for automobile use having a disk carrying device in an embodiment of the invention. FIGS. 4A and 4B are schematic side views in the disk carrying device. The general configuration and operation of the optical disk recording/reproducing device in the embodiment is similar to the conventional example shown in FIGS. 1A, 1B and FIGS. 2A, 2B, and only the configuration of the disk carrying device is different from the conventional example. Thus, for illustrative convenience, the similar components are designated by the reference numerals used for the description of the conventional example shown in FIGS. 1A, 1B and FIGS. 2A, 2B.

In FIG. 3 and FIGS. 4A, 4B, a disk carrying device 11 is provided in a front portion of a lower chassis 10 within an optical disk recording/reproducing device 100. The disk carrying device 11 includes a metal feed plate 12, where a rotary shaft 13 is provided protruding outward from the center of both side portions of the feed plate 12 and is rotatably supported by the lower chassis 10. A rubber feed roller 14 expanding from a central portion toward both end portions thereof in tapered fashion, is rotatably attached to the rear ends of the both side portions of the feed plate 12. The feed roller 14 is inserted into a roller shaft 15 by a loose fit so as to slip relative to the roller shaft 15. Incidentally, as the roller shaft 15 is thin and long, a sleeve 16 is press-fitted into a central portion thereof for the purpose of reinforcement. The sleeve 16 is configured to be supported in the central portion of the feed plate 12. The feed plate 12 is urged to rotate so that the side of the feed roller 14 is oriented upward, by extension springs 17, 18 provided respectively between the both side portions thereof and the lower chassis 10. Because of this configuration, a disk inserted in A direction from the front is held by between the feed roller 14 and a disk guide provided in an upper chassis, and thus the disk can be carried by rotation of the feed roller 14. The disk guide is integrated into the upper chassis or provided separately.

A disk carrying motor 21 is provided in one of front end portions of the lower chassis 10. A worm 23 is fixed to a motor shaft 22 of the disk carrying motor 21, where a toothed wheel 24a (worm wheel) in the first stage of a worm wheel 24 meshes with the worm 23, a first idle gear 25 (worm wheel) meshes with a toothed wheel 24b (worm wheel) in the second stage of the worm wheel 24, a second idle gear 26 meshes with the first idle gear 25, and a roller gear 27, which is fixed to the roller shaft 15 of the feed roller 14, meshes with the second idle gear 26. The worm wheel 24 and the first idle gear 25 are rotatably supported by the lower chassis 10. The second idle gear 26 and the roller gear 27 are rotatably supported by the feed plate 12. The second idle gear 26, which is located below the first idle gear 25, contacts and separates from the first idle gear 25 from below along with the swinging of the feed plate 12.

Next, the operation of the disk carrying device in the embodiment will be described with reference to FIGS. 4A, 4B. In the disk insertion shown in FIG. 4A, the drive force from the disk carrying motor 21 is transmitted from the worm 23 to the toothed wheel 24a in the first stage of the worm wheel 24, and then transmitted from the toothed wheel 24b in the second stage thereof to the first idle gear 25, the second idle gear 26, and to the roller gear 27 in series. Then, the feed roller 14 rotates to hold a disk D between it and a disk guide 2 provided in an upper chassis 1 thereon, and the disk D is carried in A direction. At this time, since a downward force F1 is applied to the second idle gear 26 by the first idle gear 25, the downward force acts on the feed roller 14 via the roller gear 27. When the disk D has been completely carried to the depth side of the device in A direction and when the feed roller 14 slips, the pushing pressure of the feed roller 14 to the disk D decreases, the load on the disk carrying motor 21 is reduced, and thus a low output motor can be adopted. In this way, the power consumption decreases and the heat from the motor is suppressed, so that the gears can be made of a relatively soft resin material as the temperature-resistance characteristic is improved and the forces on the gears decrease. Consequently it is possible to reduce gear noise from gear meshing sound.

On the other hand, as shown in FIG. 4B, when the disk D is ejected forward in B direction from the depth side of the device, an upward force F2 is applied to the second gear 26 from the first idle gear 25 and the upward force acts on the feed roller 14 via the roller gear 27. The pushing pressure of the feed roller 14 to the disk D increases, and thus the ejecting force relative to the disk D can be increased. In this way it is possible to smoothly carry the disk, regardless of the warping of the disk and the friction coefficient of the disk surface.

As described above according to the embodiment, the second idle gear 26 and the roller gear 27 meshing therewith are rotatably supported by the feed plate 12 to cause the second idle gear 26 to contact and separate from the first idle gear 25 from below, the second idle gear being rotatably supported by the lower chassis 10. Thus, in the disk insertion, the downward force F1 acts on the second idle gear 26 and the pushing pressure of the feed roller 14 to the disk D decreases, so that it is possible to reduce the rotation load on the disk carrying motor 21 at the end of the disk insertion. In the disk ejection, the upward force F2 acts on the second idle gear 26 and the pushing pressure of the feed roller 14 to the disk D increases, so that it is possible to smoothly eject the disk D even if the disk D has a warping or other defects.

Incidentally, in the above described embodiment, the rubber roller portion in the feed roller 14 is inserted into the roller shaft 15 by a loose fit so as to slip relative to the roller shaft 15. However, the rubber roller portion may be fixed to the roller shaft 15 by press-fitting or adhesion or other means. This makes it possible to improve the carrying force to the disk as the rubber roller portion does not slip relative to the roller shaft 15. According to the present invention, as the pushing pressure to the disk by the feed roller 14 decreases in the disk insertion, the rubber roller portion is fixed to the roller shaft 15 to make it possible to compensate the reduction of the carrying force due to the pushing pressure decrease. On the other hand, in the state where the disk carrying motor 21 is still rotating at the end of the carrying of the disk, the downward force F1 from the first idle gear 25 to the second idle gear 26 further increases due to the load of when the feed roller 14 slips relative to the disk, so that the feed roller 14 moves in a direction away from the disk D and slips relative to the disk D. Thus, the disk D is not damaged or no heavy load is imposed on the disk carrying motor 21.

The disk carrying device according to the present invention has an advantage that it is possible to adopt a low output motor as the load on the disk carrying motor is reduced in the disk insertion, and possible to improve the disk ejecting force in the disk ejection. It is usable as a disk carrying device for carrying a disk by a rotatable feed roller and as an optical disk recording/reproducing device using the same.

Further in the disk carrying device according to the present invention, a worm gear includes: a worm fixed to a motor shaft of a disk carrying motor; a worm wheel rotatably supported by a lower chassis in the vertical direction to mesh with the worm; and a worm formed in the same shaft above the worm wheel to mesh with a first idle gear. This makes it possible to provide the first idle gear above the disk carrying motor located below the lower chassis, and thus to cause a second gear to contact and separate from the first idle gear from below along with the swinging of the feed plate.

Further, the disk carrying device according to the present invention has a configuration that a roller portion of the feed roller is fixed to a roller shaft. Thus, it is possible to increase the carrying force to the disk as the roller portion does not slip relative to the roller shaft. In addition, in the sate where the disk carrying motor is still rotating when the disk has been completely carried to the depth side of the device, the pushing pressure to the disk by the feed roller is weak, and the downward force applied to the second idle gear by the first idle gear further increases due to the load generated when the rubber roller slips relative to the disk. Thus, the disk is not damaged and no large load is on the disk carrying motor, although the rubber roller is fixed to the roller shaft.

Further, the present invention is to realize an optical disk recording/reproducing device having the disk carrying device with the above described features. Thus, it is possible to provide a high-performance, thin and small sized optical disk recording/reproducing device with a high disk ejecting force, a small motor load, and less gear noise.

The present invention has been described based on the preferred embodiment shown by the accompanying drawings. It is apparent that the present invention can be easily changed and modified by those skilled in the art without departing from the spirit and scope of the present invention, and such modifications are intended to be included within the scope of the present invention.

What is claimed is:

1. A disk carrying device, comprising:
 a feed plate that rotatably supports a feed roller;
 a lower chassis that rotatably supports the feed plate;
 a disk carrying motor fixed to the lower chassis to rotate the feed roller via a gear array;

a disk guide provided in an upper chassis to hold a disk between it and the feed roller; and a spring that urges the feed roller to rotate so that the feed roller abuts the disk guide, wherein the gear array includes:

a worm gear that transmits a torque of the disk carrying motor;

a first idle gear rotatably supported by the lower chassis to transmit the torque from the worm gear;

a second idle gear rotatably supported by the feed plate and being detachably engaged with the first idle gear; and a roller gear fixed to a roller shaft of the feed roller to mesh with the second idle gear.

2. The disk carrying device according to claim 1, wherein the worm gear comprises:

a worm fixed to a motor shaft of the disk carrying motor;

a worm wheel rotatably supported by the lower chassis in a vertical direction to mesh with the worm; and a worm formed in the same shaft above the worm wheel to mesh with the first idle gear.

3. The disk carrying device according to claim 1, wherein a roller portion of the feed roller is fixed to the roller shaft.

4. An optical disk recording/reproducing device, comprising the disk carrying device according to claim 1.

* * * * *